W. R. WILSON.
VEHICLE HUB.
APPLICATION FILED MAR. 5, 1908.
923,919.
Patented June 8, 1909.
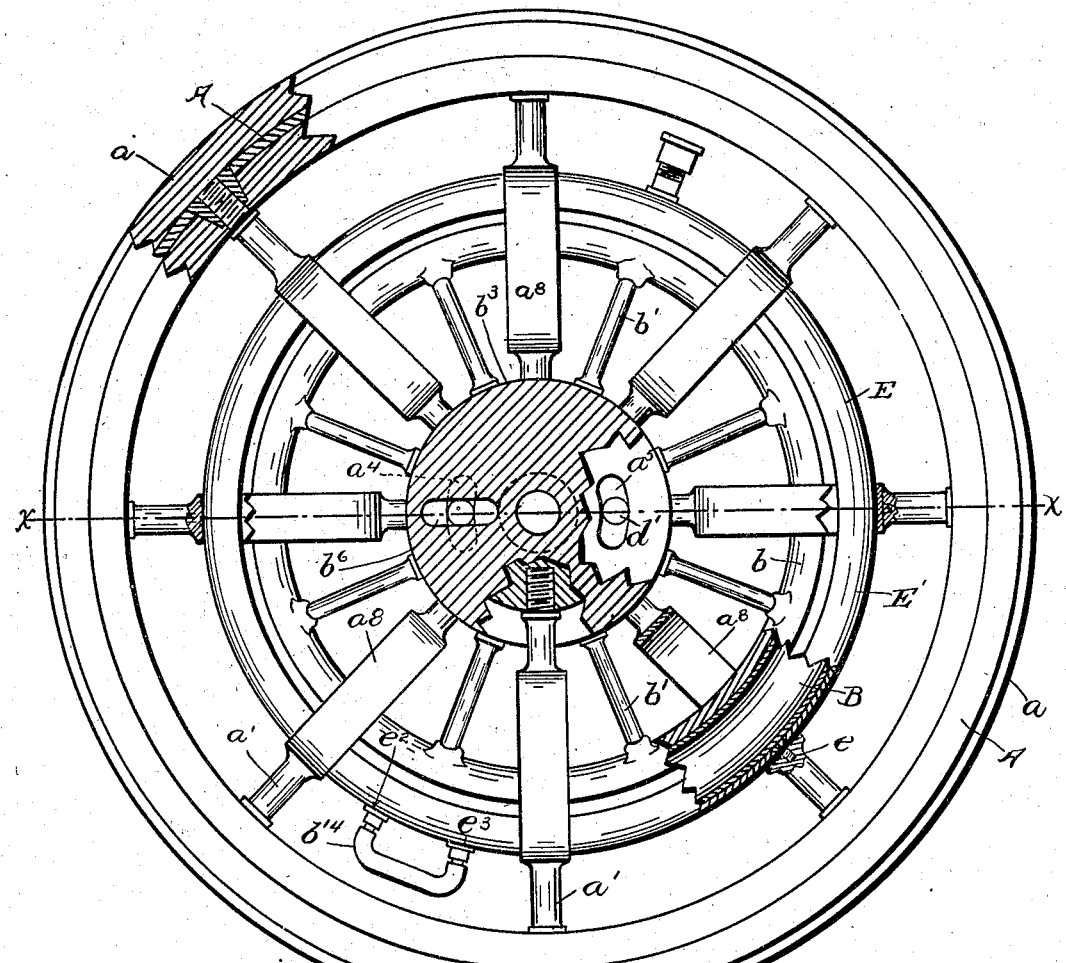
Fig. 1.
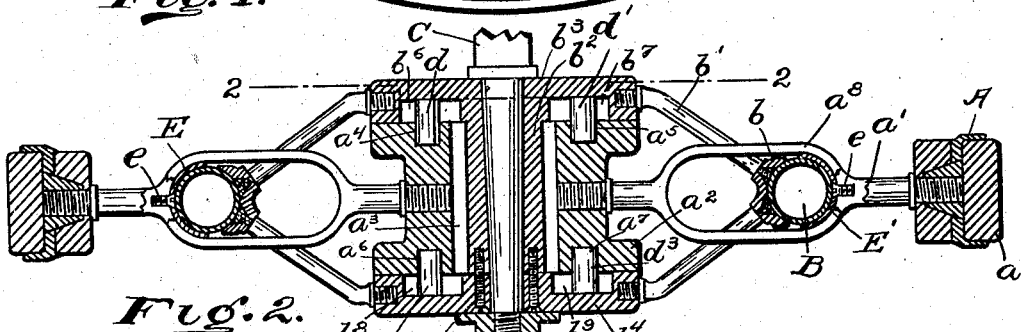
Fig. 2.
Fig. 3.
Witnesses
A. McCormack.
C. W. Miles.
Inventor
William R. Wilson
By Walter F. Murray
Attorney

UNITED STATES PATENT OFFICE.

WILLIAM R. WILSON, OF CINCINNATI, OHIO.

VEHICLE-HUB.

No. 923,919.      Specification of Letters Patent.      Patented June 8, 1909.

Application filed March 5, 1908. Serial No. 419,241.

*To all whom it may concern:*

Be it known that I, WILLIAM R. WILSON, a citizen of the United States of America, and resident of Cincinnati, county of Hamilton, State of Ohio, have invented certain new and useful Improvements in Vehicle-Hubs, of which the following is a specification.

The object of my invention is a vehicle hub supplied with a pneumatic tire, and with means of protecting the tire from puncture and wear. This object is attained by the means described in the specification and illustrated in the accompanying drawings, in which, Figure 1 is a view partly in elevation, and partly in section upon line 2—2 of Fig. 2 of a vehicle hub embodying my invention. Fig. 2 is a central sectional view upon line $x$—$x$ of Fig. 1. Fig. 3 is a detail view of the ends of the pneumatic tire and the means of connecting them.

Referring to the parts: the wheel consists of a primary wheel which has rim, A, with a cushion tire, $a$, spokes, $a'$, and a hub, $a^2$, and a secondary wheel which has a pneumatic tire, B, a rim, $b$, spokes, $b'$ and a hub whose sleeve, $b^2$, is journaled upon the axle, C, of the vehicle. The hub of the secondary wheel consists of a circular disk, $b^3$, formed integral with the sleeve, $b^2$, and of a circular disk, $b^4$, which is secured to the sleeve, $b^2$, by screws, $b^5$. The spokes, $b'$, of the secondary wheel are screwed into sockets in the peripheries of the disks, $b^3$, $b^4$. Upon the inner faces of the disks, $b^3$, $b^4$, are radial grooves, $b^6$, $b^7$, $b^8$ and $b^9$. The hub, $a^2$, of the primary wheel has an internal bore, $a^3$, of a diameter greater than the external diameter of the sleeve, $b^2$, so that the hub, $a^2$, will have a radial play upon the sleeve, $b^2$. Hub, $b^2$, has upon each of its ends sectoral grooves, $a^4$, $a^5$, $a^6$, and $a^7$. Grooves, $a^4$ and $a^5$, are at diametrically opposite points, as are likewise grooves, $a^6$ and $a^7$. Cylindrical pin, $d$, is located in grooves, $a^4$ and $b^6$; pin, $d'$, is located in grooves, $a^5$ and $b^7$; pin, $d^2$, is located in grooves, $a^6$ and $b^8$; and pin, $d^3$, is located in grooves, $a^7$ and $b^9$.

Spokes $a'$, are laterally expanded so as to form oval yokes, $a^8$, which pass over the pneumatic tire, B, and the rim, $b$. Between the periphery of the tire, B, and the yokes, $a^8$, are two semicircular sheaths, E, E', which are secured to spokes by screws, $e$. Pneumatic tire, B, is a flexible tube closed at both ends, one end, $b^{10}$, being forked and the other end, $b^{11}$, being pointed to dove-tail into forked end, $b^{10}$, each end carrying a nipple, $b^{12}$, $b^{13}$, to be connected by a tube, $b^{14}$, screw-threaded at its ends to fit onto the nipples, $b^{12}$, $b^{13}$. Sheaths, E, E', are perforated at $e^2$, $e^3$, to pass the nipples, $b^{12}$, $b^{13}$.

In use it is seen that the pneumatic tire never comes in contact with the ground, which is contacted only by the cushion tire, $a$. The vibration of the vehicle is cushioned by the pneumatic tire, B, because of the play between the secondary and primary wheels, which takes place at their hubs, because of the movement of the pins, $d$, $d'$, $d^2$ and $d^3$, in the grooves, $a^4$ through $a^7$, and $b^6$ through $b^9$.

What I claim is:

In a vehicle the combination of a secondary and a primary wheel, the secondary wheel consisting of a hub made up of two disks connected by a sleeve to be journaled upon an axle, a rim, spokes joining the disks of the hub to the rim and a pneumatic tire seated on the rim, and the primary wheel consisting of a hub surrounding the sleeve between the disks, and having a bore of greater diameter than the diameter of the sleeve, a rim of larger diameter than that of the secondary wheel and spokes connecting the hub of the primary wheel with its rim and having yokes surrounding the rim of the secondary wheel and contacting the outer periphery of the pneumatic tire, the adjacent faces of the disks and the hub of the primary wheel having radial and sectoral grooves and pins seated in the grooves to permit of a play between the said hubs.

WILLIAM R. WILSON.

Witnesses:
    WALTER F. MURRAY,
    AGNES MCCORMACK.